(12) United States Patent
Cobb, III et al.

(10) Patent No.: US 7,630,610 B2
(45) Date of Patent: Dec. 8, 2009

(54) LOOP BACK PLUG WITH PROTECTIVE DUST CAP

(75) Inventors: John Clifton Cobb, III, Fitchburg, MA (US); Yu Lu, Eden Prairie, MN (US); Randy Reagan, Clinton, MA (US)

(73) Assignee: ADC Telecommunications, Inc., Eden Prairie, MN (US)

(\*) Notice: Subject to any disclaimer, the term of this patent is extended or adjusted under 35 U.S.C. 154(b) by 181 days.

(21) Appl. No.: 11/771,306

(22) Filed: Jun. 29, 2007

(65) Prior Publication Data

US 2009/0002689 A1    Jan. 1, 2009

(51) Int. Cl.
*G02B 6/00* (2006.01)
*G01N 21/00* (2006.01)

(52) U.S. Cl. .......................... 385/139; 385/53; 385/56; 385/58; 385/60; 385/76; 385/77; 385/78; 385/134; 356/73.1

(58) Field of Classification Search ............... 385/53, 385/56, 58, 60, 70, 71, 72, 76, 77, 78, 86, 385/134, 136, 137, 138, 139; 356/73.1
See application file for complete search history.

(56) References Cited

U.S. PATENT DOCUMENTS

| | | | | |
|---|---|---|---|---|
| 4,736,100 A | * | 4/1988 | Vastagh | 250/227.11 |
| 5,039,456 A | * | 8/1991 | Bowen et al. | 264/1.25 |
| 5,076,688 A | * | 12/1991 | Bowen et al. | 356/73.1 |
| 6,454,464 B1 | * | 9/2002 | Nolan | 385/60 |
| 7,489,849 B2 | * | 2/2009 | Reagan et al. | 385/135 |
| 2006/0233506 A1 | * | 10/2006 | Noonan et al. | 385/134 |
| 2006/0257092 A1 | * | 11/2006 | Lu et al. | 385/134 |
| 2007/0274658 A1 | * | 11/2007 | Isenhour et al. | 385/134 |
| 2009/0002689 A1 | * | 1/2009 | Cobb et al. | 356/73.1 |

\* cited by examiner

*Primary Examiner*—Brian M Healy
(74) *Attorney, Agent, or Firm*—Merchant & Gould P.C.

(57) ABSTRACT

A loop back device can include a dust cap with which to protect the loop back ferrule after use to facilitate reuse of the loop back device. The dust cap can be provided at a free end of the loop back device when the loop back device is secured to a tether connector. When the loop back device is removed from the tether connector, the dust cap is removed from the free end of the device and is mounted over the ferrule to protect the loop back ferrule.

12 Claims, 8 Drawing Sheets

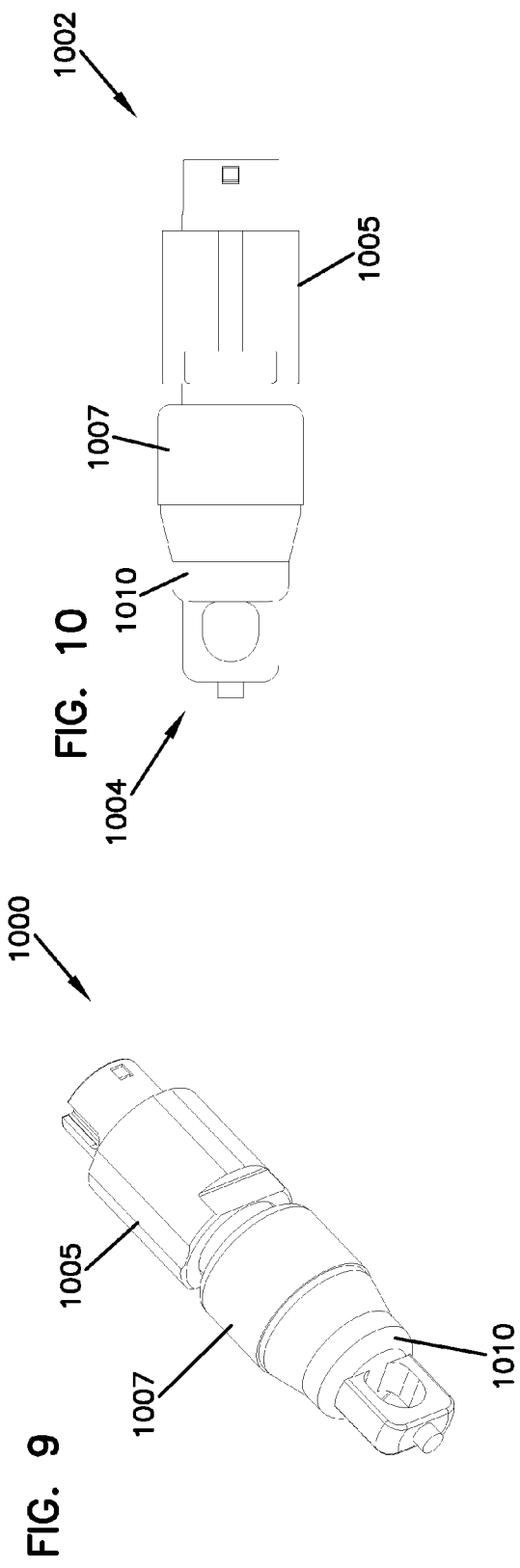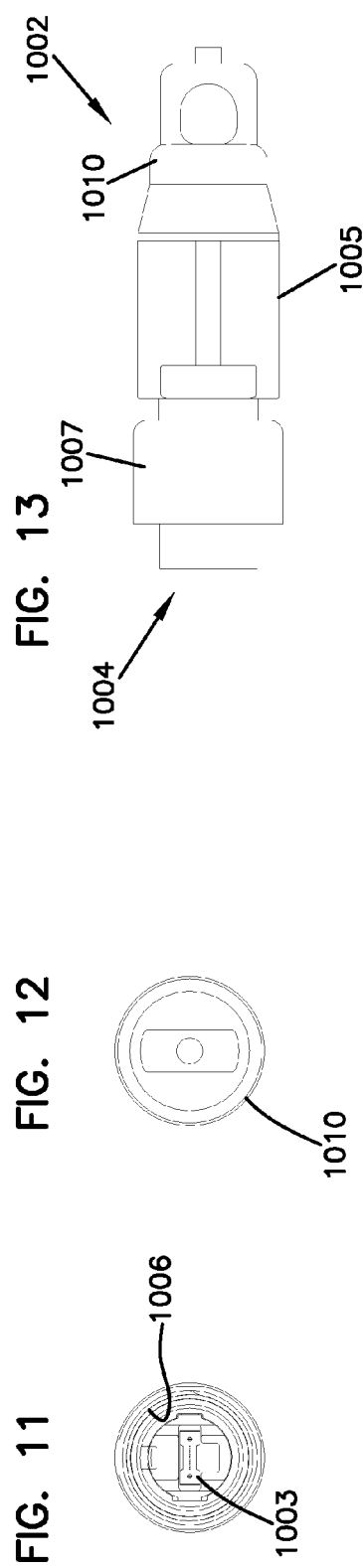

US 7,630,610 B2

LOOP BACK PLUG WITH PROTECTIVE DUST CAP

TECHNICAL FIELD

The present invention relates to fiber optic cable networks. More specifically, the present invention relates to loop back connectors and methods for testing lines in fiber optic networks.

BACKGROUND

Fiber optic telecommunications technology is becoming more prevalent in part because service providers want to deliver high bandwidth communication capabilities to customers. A typical fiber optic telecommunications system includes a network of fiber optic cables (e.g., distribution cables, branch cables, drop cables) routed from a central location (e.g., a service provider's central office) to remote locations in close proximity to subscribers. The fiber optic telecommunications systems also can include additional components, such as fiber distribution hubs housing optical splitters for splitting optical signals and drop terminals providing interconnect locations for facilitating connecting subscribers to the fiber optic network.

U.S. Patent Publication No. 2006/0233506A1, which is hereby incorporated herein by reference in its entirety, discloses a fiber optic network including a distribution cable having factory terminated breakout locations. Each breakout location includes a factory installed multi-fiber connector adapted for connection to a connectorized branch cable in the field. At the factory, loop-back connectors are connected to the multi-fiber connector to facilitate testing the breakout locations when the distribution cable is installed in the field.

For example, upon installation of the distribution cable, a test signal can be injected through the distribution cable from a first location (e.g., the central office), transmitted through the breakout location, looped back at the loop back connector, and received at the first location. In this way, the testing process is made more efficient by allowing testing from one location.

SUMMARY

According to the present disclosure, a loop back device and methods for testing lines in a fiber optic network are disclosed. In certain embodiments, the loop back device can include a dust cap and a dust cap storage location.

A method for testing lines in a fiber optic network is also disclosed. The method includes inputting a signal onto a first optical path at a first location, looping back the signal at a second location to a second optical path and receiving the signal from the second optical path at the first location. A loop back device can be used at the second location to loop back the signal to the first location. The method also includes protecting ends of the loop back device by mounting a dust cap over a ferrule of the loop back device when the loop back device is removed from the optical path.

BRIEF DESCRIPTION OF THE DRAWINGS

FIG. 9 is a is a rear, perspective view of a loop back device and dust cap having features that are examples of inventive aspects in accordance with the teachings of the present disclosure;

FIG. 10 is a side elevational view of the loop back device and dust cap of FIG. 9;

FIG. 11 is a front end view of the loop back device of FIG. 9;

FIG. 12 is a rear end view of the loop back device of FIG. 9;

FIG. 13 is a side elevational view of the loop back device of FIG. 9 in which the dust cap has been removed from the rear end of the loop back device and mounted to the front end.

DETAILED DESCRIPTION

The following detailed description of implementations consistent with the principles of the invention refers to the accompanying drawings. The same reference numbers in different drawings may identify the same or similar elements.

Figure 1:
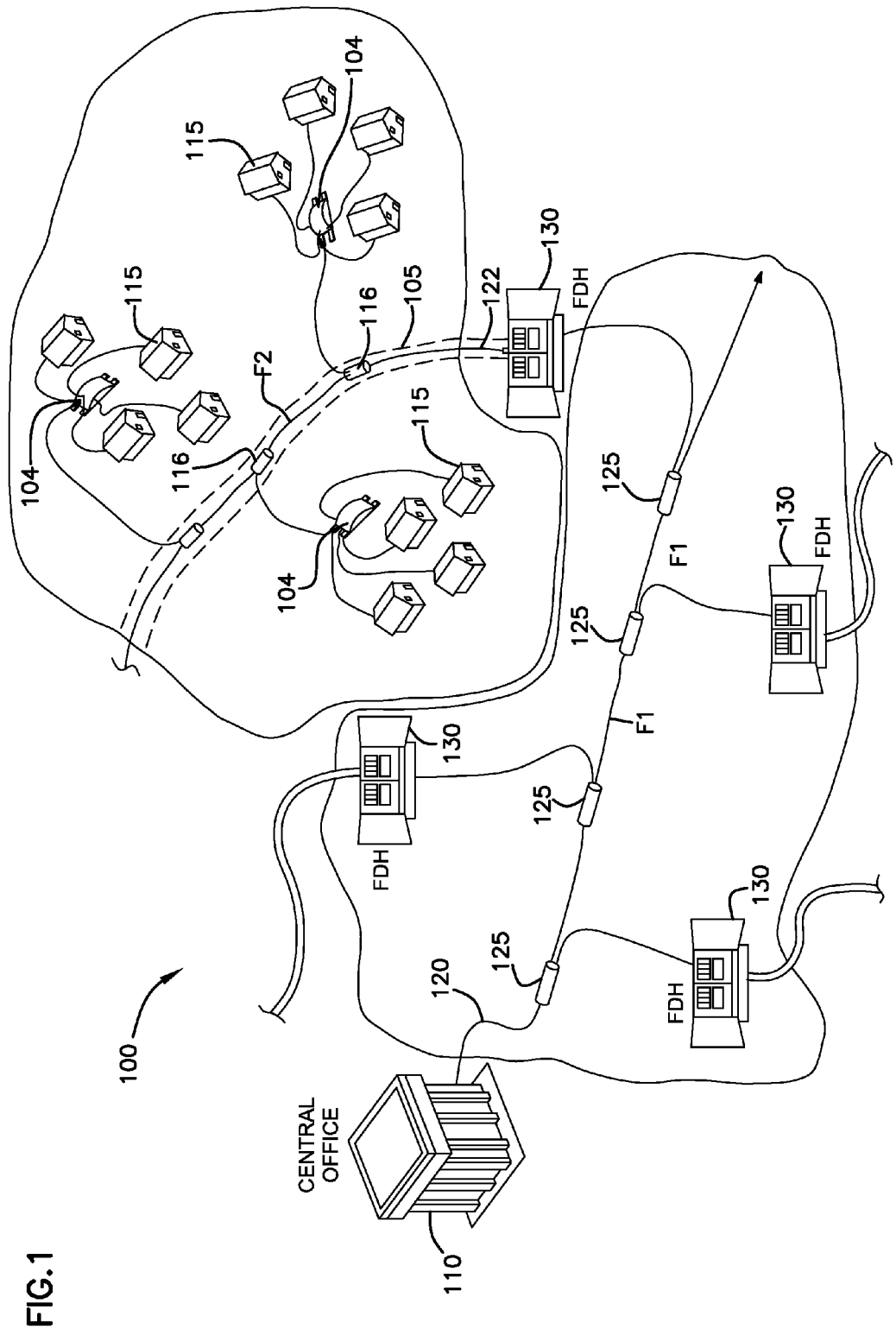
FIG. 1 illustrates an exemplary passive optical network that may use factory integrated terminations consistent with the principles of the invention.

FIG. 1 illustrates an exemplary passive optical network 100 that may use factory integrated terminations consistent with the principles of the invention. As shown in FIG. 1, the network 100 may include a central office 110 that connects a number of end subscribers 115 (also called end users 115 herein). The central office 110 may additionally connect to a larger network such as the Internet (not shown) and a public switched telephone network (PSTN). The various lines of the network can be aerial or housed within underground conduits (e.g., see conduit 105).

In general, the network 100 includes feeder distribution cables (e.g., main cable 120) associated at one end with the central office 110. The portion of network 100 that is closest to central office 110 is generally referred to as the F1 region, where F1 refers to the "feeder fiber" from the central office. The F1 portion of the network may include a feeder cable (i.e., an F1 distribution cable) having on the order of 12 to 48 fibers; however, alternative implementations may include fewer or more fibers. The network 100 also has an F2 portion that includes cables and components located in closer proximity to the subscriber/end users 115.

The network 100 also may include fiber distribution hubs (FDHs) 130 that receive fibers of the main cable 120 extending from splice locations 125 and that output one or more F2 distribution cables 122. In general, an FDH 130 is an equipment enclosure that may include a plurality of optical splitters (e.g., 1-to-8 splitters, 1-to-16 splitters, or 1-to-32 splitters) for splitting the incoming feeder fibers into a number (e.g., 216, 432, etc.) of output distribution fibers corresponding to the F2 distribution cables 122. The F2 distribution cables are routed from the FDH 130 to locations in close proximity to the end users 115.

The network 100 typically includes a plurality of breakout locations 116 at which branch cables (e.g., drop cables, stub cables, etc.) are separated out from or optically coupled to distribution cables 122. Breakout locations 116 also can be referred to as tap locations or branch locations and branch cables also can be referred to as breakout cables or tethers. At a breakout location, fibers of the distribution cable can be broken out and connectorized to form a connectorized tether. In other embodiments, fibers of the distribution cable can be broken out and spliced to a length of optical fiber having a connectorized free end so as to form a connectorized tether.

Stub cables are typically branch cables that are routed from breakout locations 116 to intermediate access locations 104, such as a pedestals, drop terminals or hubs. Intermediate access locations 104 can provide connector interfaces located between breakout locations 116 and the subscriber locations 115. A drop cable is a cable that typically forms the last leg to a subscriber location 115. For example, drop cables can be routed from intermediate access locations 104 to subscriber locations 115. Drop cables also can be routed directly from breakout locations 116 to subscriber locations 115, thereby bypassing any intermediate access locations 104.

In certain embodiments, factory integrated terminations may be used at the F1 and/or the F2 region to provide environmentally sound and cost effective splicing protection. Factory integrated terminations refer to the use of factory integrated access (tap) points at specified locations, such as at breakout locations 116, in the network 100 instead of field installed splices. These access points 116 may be connectorized to provide a simple plug and play approach in the distribution portion of the network 100 when connecting subscribers 115 to the network 100. For example, implementations consistent with the principles of the disclosure may use rugged outside plant connectors that can accommodate single or multi-port connectors.

Figure 2:
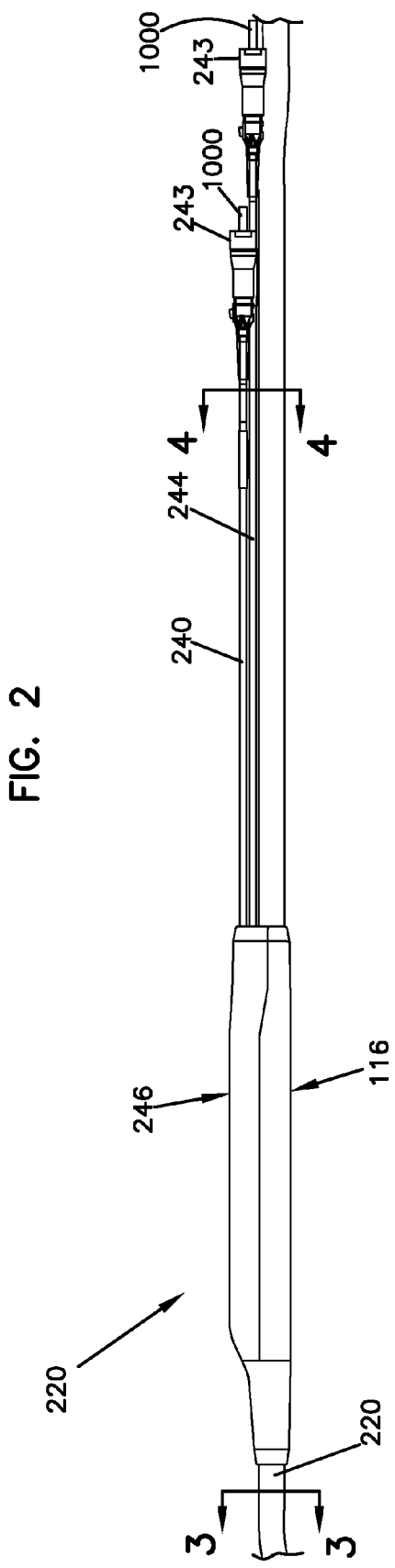
FIG. 2 is a partial side view of a distribution cable having a tether branching out at a breakout location, the tether being terminated at a multi-fiber connector on which a loop back device is mounted.

FIG. 2 illustrates an exemplary distribution cable 220 having features that are examples of inventive aspects in accordance with the principles of the present disclosure. The distribution cable 220 may have factory integrated breakout locations 116 at which some fibers $224_{dc}$ (FIG. 3) of the distribution cable 220 are broken out and coupled (e.g., spliced) to fibers $224_t$ (FIG. 4) of a tether cable 240. The coupled optical fibers $224_{dc}$, $224_t$ can be protected by an enclosure 246. For example, in FIG. 2, the distribution cable 220 and the tether 240 have been overmolded at the breakout location 116 to protect the coupled optical fibers $224_{dc}$, $224_t$.

The second ends of the tether fibers $224_t$ can either be connectorized or unconnectorized. In a preferred embodiment, the fibers $224_t$ of the tethers 240 are terminated with multi-fiber connectors (MFCs) 243 (e.g., see FIGS. 2, 6, and 7). In use, the MFCs 243 of the tethers 240 can be interconnected with branch cables terminated with MFCs to provide a fiber optic transmission path that extends from the distribution cable 220, through the tether 240, to the branch cable. For example, in a preferred embodiment, tethers 240 are relatively short (e.g., extending less than about three feet in length). In alternative embodiments, the tethers 240 can be sufficiently long to function as drop/stub cables and can be routed from distribution cables 220 to user locations 115 or drop terminals 104.

Figure 8:
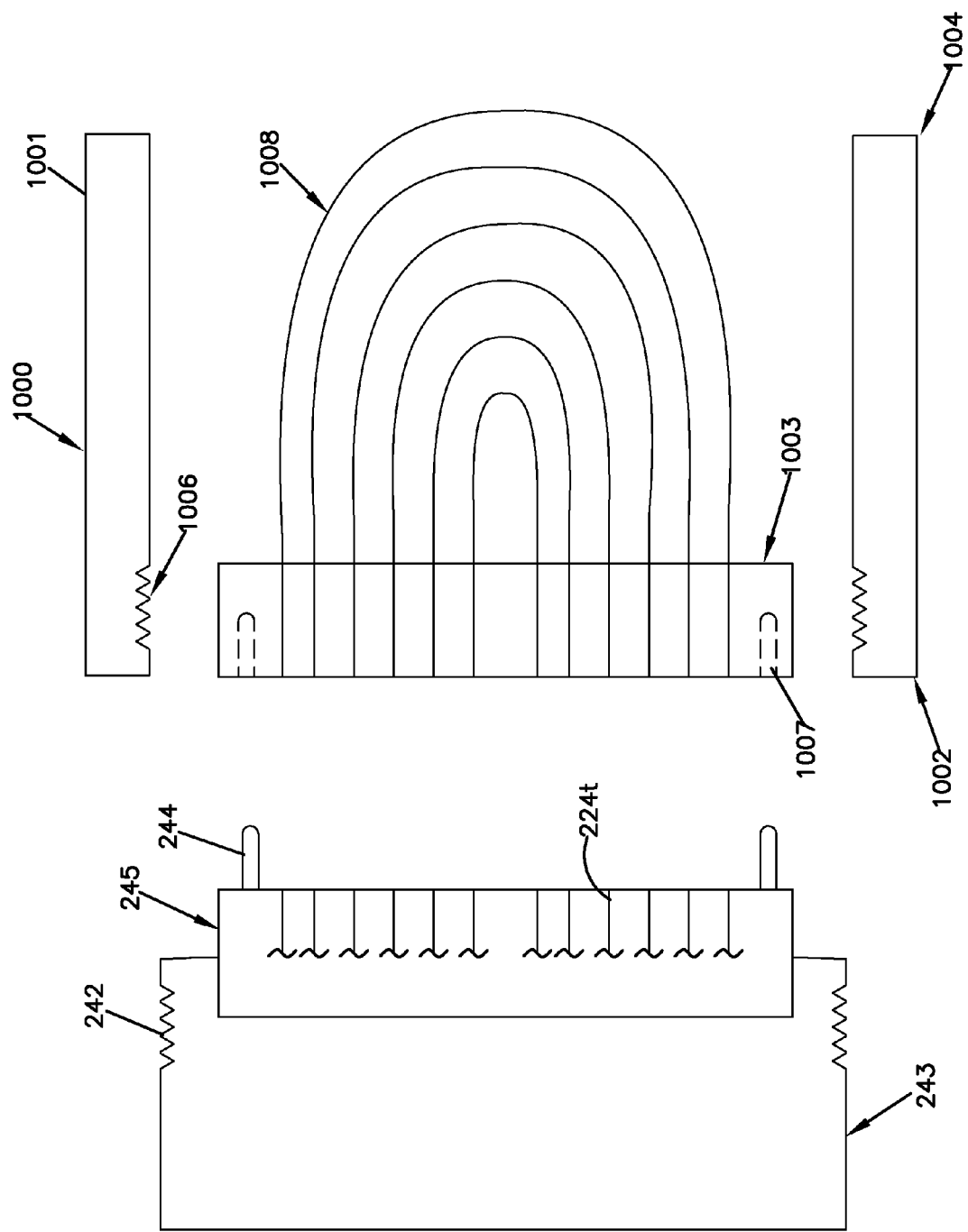
FIG. 8 is a partial schematic view of a loop back device aligned to interface with a multiple fiber connector.

In certain embodiments, a loop back device 1000 (FIG. 2) can be utilized to test factory integrated terminations consistent with the principles of the disclosure. Such a loop back device 1000 can be used to facilitate testing the transmission capabilities of the distribution cable fibers $224_{dc}$ and/or the tether fibers $224_t$. In general, as shown in FIG. 8, the loop back device 1000 includes a loop back ferrule 1003 that may be configured to couple a first fiber of a MFC 243 to a second fiber of a MFC 243.

At the central office 110 (FIG. 1), a test signal can be transmitted into a first fiber and detected on the second fiber at the central office 110. Properties of the return signal provide an indication of the functionality of the optical fibers 224. Use of a loop back device 1000 may eliminate shuttling back and forth between a tether connector 243 (or breakout location 116) and a central office 110 when testing is performed. Eliminating shuttling can produce significant time and cost savings when testing deployed distribution cables 220. An exemplary method of testing a fiber drop terminal from a single location using loop back connectors is shown in U.S. patent application Ser. Nos. 11/198,848 and 11/198,153, assigned to Fiber Optic Network Solutions Corp, the disclosures of which are hereby incorporated by reference.

Figure 3:
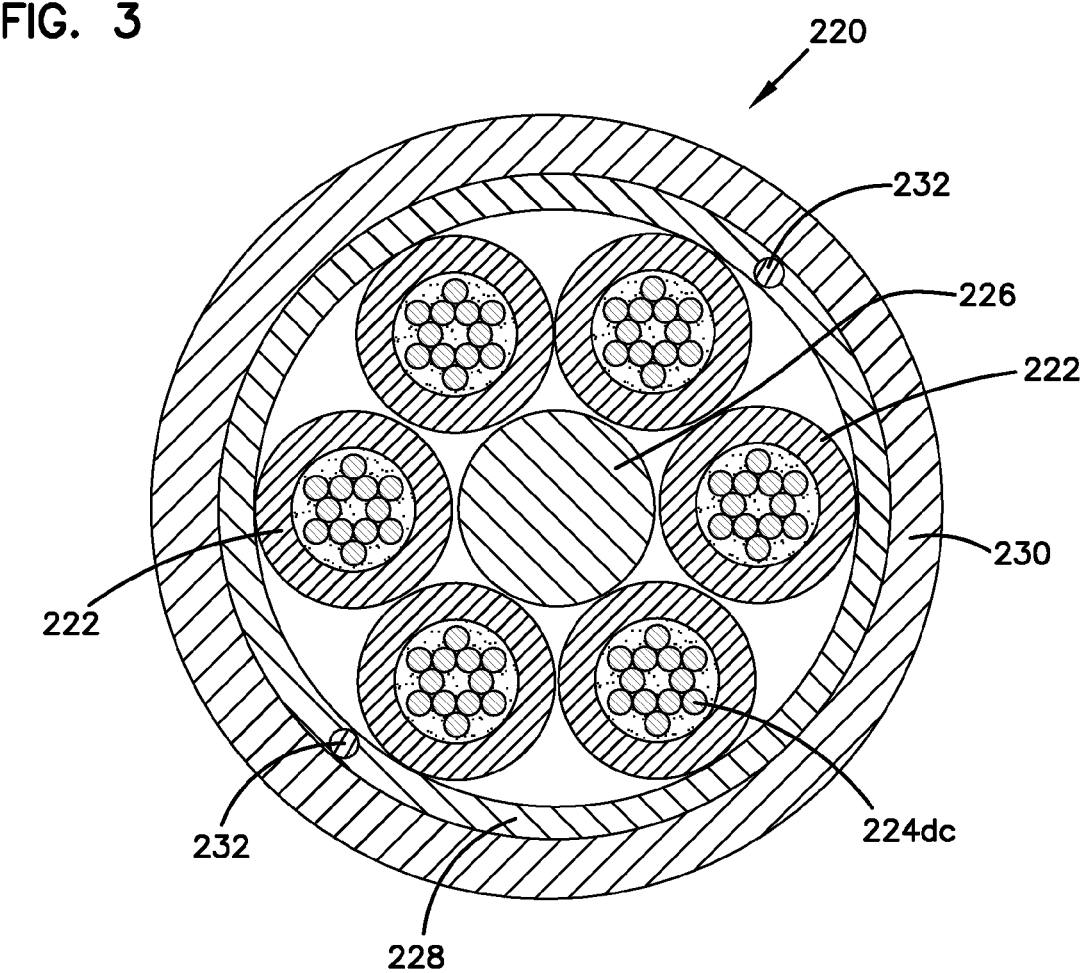
FIG. 3 is a cross-sectional view of a distribution cable taken along the line 3-3 of FIG. 2.
Figure 4:
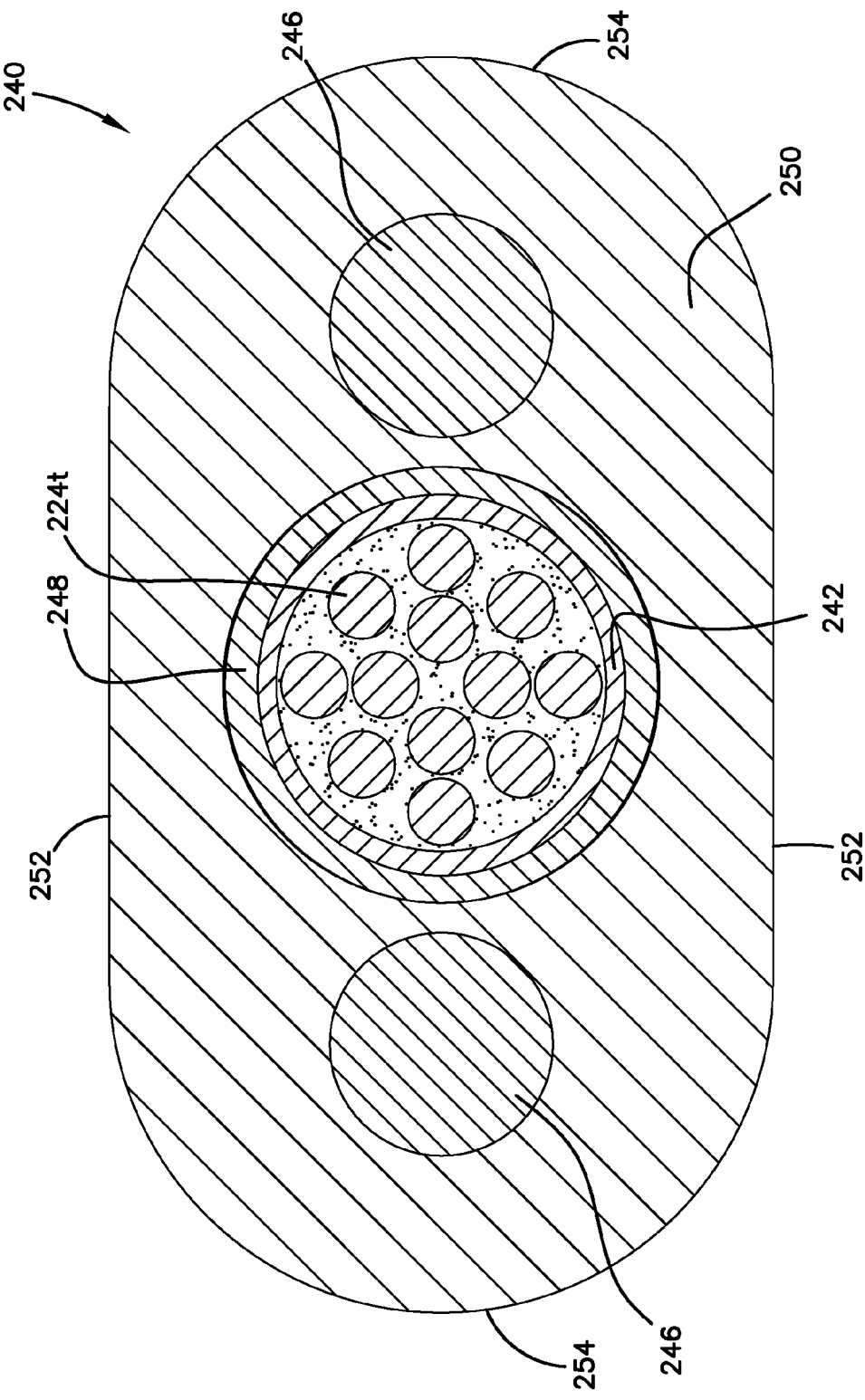
FIG. 4 is a cross-sectional view of a tether taken along the line 4-4 of FIG. 2.
Figure 5:
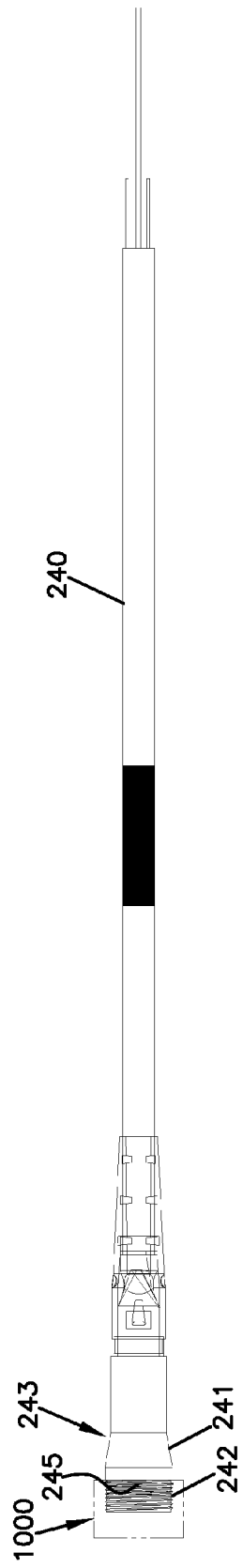
FIG. 5 is a partial view of a tether on which a multiple fiber connector and a loop-back device are mounted.

Referring to FIGS. 3-5, additional details with respect to an example distribution cable 220 and an example tether 240 are discussed. A typical distribution cable 220 includes a relatively large number of fibers (e.g., 72, 144 or more fibers). The fibers are typically segregated into separate groups with each group contained within a separate buffer tube (e.g., see FIG. 3). The fibers within each buffer tube can include either ribbon fibers or loose fibers. FIG. 3 shows an example distribution cable 220 including six separate buffer tubes 222 each containing twelve fibers $224_{dc}$. The buffer tubes 222 may be gel filled.

The distribution cable 220 also includes a central strength member 226 for reinforcing the cable 220, and an outer strength layer 228, such as aramid fiber/yarn (e.g., Kevlar® fiber), also for reinforcing the cable 220. The distribution cable 220 further includes an outer jacket 230 that encloses the buffer tubes 222. The outer jacket 230 can provide strength and abrasion resistance to the optical fibers $224_{dc}$ running inside the distribution cable 220. The outer jacket 230 may be manufactured from UV resistant plastic and may include reinforcing fibers. Ripcords 232 can be provided for facilitating tearing away portions of the jacket 230 to access the fibers $224_{dc}$ within the cable 220.

FIGS. 4-5 illustrates an example tether 240 configured to join to the distribution cable 220 at a breakout location 116. The tether 240 includes fibers $224_t$ that extend between first and second ends. The tether 240 most commonly has a fewer number of fibers $224_t$ as compared to the number of fibers $224_{dc}$ provided within the distribution cable 220. In an example embodiment, the tether 240 has no more than twelve fibers $224_t$.

The tether 240 includes a central buffer tube 242 containing multiple fibers $224_t$ (e.g., typically one to twelve loose or ribbonized fibers). Strength members 246 (e.g., flexible rods formed by glass fiber reinforced epoxy) are positioned on opposite sides of the central buffer tube 242. An outer jacket (i.e., sheath) 250 surrounds the strength members 246 and the buffer tube 242. An additional strength layer 248 (e.g., aramid fiber/yarn) can be positioned between the buffer tube 242 and the outer jacket 250.

In the example shown in FIG. 4, the tether 240 is depicted as having a flat cable configuration. The outer jacket 250 includes an outer perimeter having an elongated transverse cross-sectional shape. The transverse cross-sectional shape includes oppositely positioned, generally parallel sides 252 interconnected by rounded ends 254. However, any suitable cable configuration can be utilized for both the distribution cable and the tether cable.

Figure 7:
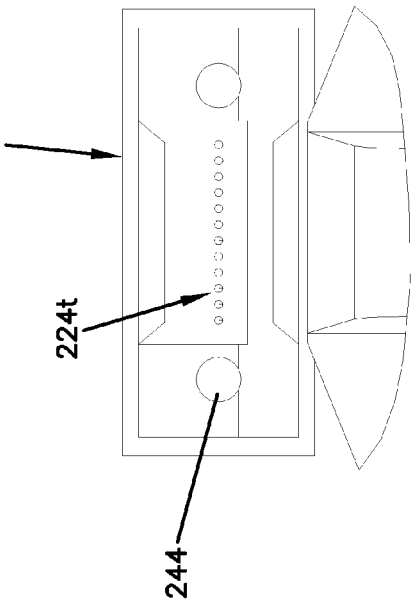
FIG. 7 is an exploded view of the ferrule of the multiple fiber connector of FIG. 6.
Figure 6:
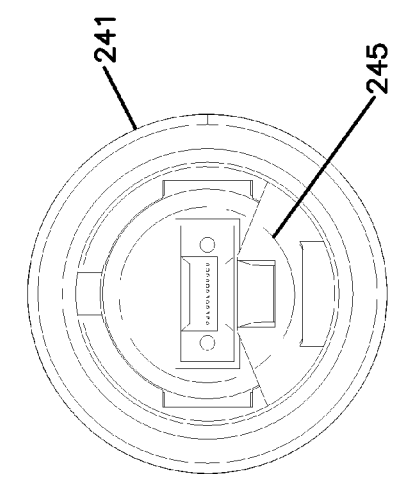
FIG. 6 is an end view of the multiple fiber connector of FIG. 5 with the loop-back device removed.

As shown in FIG. 5, each MFC 243 terminating a tether 240 includes a connector housing 241 enclosing a ferrule 245. The ferrule 245 retains the optical fibers $224_t$ of the tether 240. For example, as shown in FIGS. 6 and 7, one embodiment of a ferrule 245 retains twelve optical fibers $224_t$ of the tether 240. The ferrule 245 also can include an alignment mechanism to facilitate coupling the ferrule 245 to a mating MFC ferrule of a cooperating connector (e.g., of a branch cable). The alignment mechanism of the ferrule 245 can include protruding posts 244 (FIGS. 6-8) adapted to fit into cooperating recesses in the mating ferrule (not shown). The connector housing 241 also can define a threaded portion 242 on which the cooperating connector can be secured. In other embodiments, any desired alignment mechanism can be utilized.

FIG. 8 illustrates a schematic view of one example loop back device 1000 configured to cooperate with a schematic representation of an MFC 243 (e.g., terminating a tether 240) consistent with the principles of the disclosure. The loop back device 1000 includes a housing 1001 that extends from a first end 1002 to a second end 1004. The first end 1002 of the loop back device 1000 defines an opening through which an optical fiber ferrule (e.g., another MFC) 1003 is accessible.

The loop back housing 1001 encloses the ferrule 1003 and a fiber loop 1008 coupled to the ferrule 1003. The fiber loop 1008 defines at least a first optical path along which optical signals can propagate. The fiber loop 1008 can define multiple optical paths. In the example shown in FIG. 8, the fiber loop 1008 defines six optical paths.

The fiber loop 1008 optically couples together pairs of fibers $224_t$ of the tether 240. For example, a signal propagating along a first tether fiber $224_t$ will enter the first optical path at the ferrule 1003, propagate along the first optical path towards the second end 1004 of the loop back device 1000, and then curves back to the ferrule 1003 at which the signal will be transmitted to a second optical fiber $224_r$. Alternatively, the ferrule 1003 may optically couple together fibers $224_{dc}$ of the distribution cable 220.

The first end 1002 of the loop back device 1000 also defines a first connection section 1006 configured to secure the loop back device 1000 to a connectorized end of a tether, stub cable, or other such cable. For example, the first connection section 1006 of the loop back device 1000 shown in FIG. 8 defines a first threaded region configured to cooperate with a second threaded region 242 defined on the housing 241 of the MFC 243 of tether 240.

In certain embodiments, the first end 1002 of the loop back device 1000 also defines an alignment mechanism to facilitate alignment of the ferrules 1003 and 245. For example, the loop back ferrule 1003 can define recesses 1007 configured to receive protrusions 244 of the ferrule 245 of tether 240. In other embodiments, however, other keying structures can be utilized.

Referring to FIGS. 9-14, one aspect of the present disclosure relates to configurations for protecting the ferrules 1003 of the loop back devices 1000 to facilitate reuse. For example, a loop back devices 1000 can include a dust cap 1010 with which to protect the loop back ferrule 1003 after use. In general, to protect the ferrule 1003 on the loop back device 1000, the dust cap 1010 is removed from the second end 1004 of the loop back device 1000 and is mounted over the ferrule 1003 at the first end 1002 of the device 1000.

Figure 14:
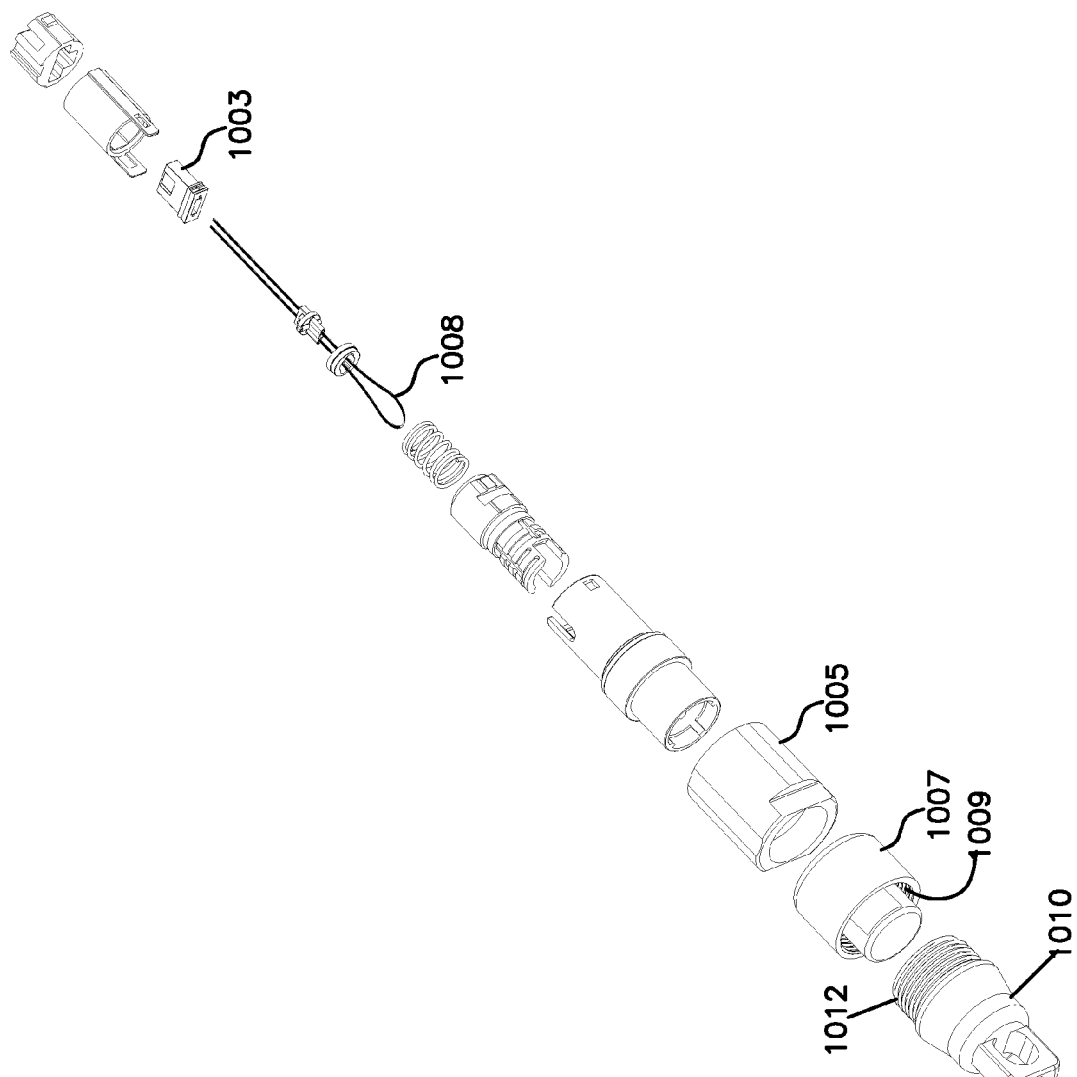
FIG. 14 is an exploded view of a loop back device having features that are examples of inventive aspects in accordance with the teachings of the present disclosure.

The loop back device 1000 includes an outer housing 1001 enclosing the ferrule 1003 and the fiber loop 1008 (FIG. 14). In the example shown, the loop back housing 1001 includes a first body member 1005 coupled to a second body member 1007 (FIG. 10). The first body member 1005 defines the first connection region 1006, which couples to the threaded region 242 of the tether connector 243 (e.g., see FIG. 8). The second body member 1007 defines a second connection region 1009 (FIG. 14). Each connection section 1006, 1009 of the loop back housing 1001 is configured to enable selective mounting of the dust cap 1010.

The dust cap 1010 can include an interface region 1012 (e.g., a threaded region). The interface region 1012 of the dust cap 1010 cooperates alternately with the first connection region 1006 of the first body member 1005 and the second connection region 1009 of the second body member 1007. In the example shown, the interface region 1012 is defined on an exterior of the dust cap 1010 and the connection regions 1006, 1009 are defined on the interior of the first and second body members 1005, 1007, respectively. In other embodiments, however, dust cap 1010 may utilize a different interface structure.

In use, the distribution cable 220 is manufactured with at least one preterminated tether 240. Typically, the distribution cable 220 includes multiple preterminated tethers 240 connected to the distribution cable 220 at breakout locations 116 along the length of the distribution cable 220 in the factory. Loop back devices 1000 are coupled to the terminations (e.g., MFC's) 243 of the tethers 240 in the factory. Additionally, loop back dust caps 1010 can be coupled to the loop back devices 1000 in the factory.

The dust cap 1010 is initially mounted to (e.g., screwed onto) the second connection section 1009 of the loop back device 1000 to provide access to the ferrule 1003 on the opposite end 1002 of the loop back device 1000. In other embodiments, however, the dust cap 1010 can be friction fit or otherwise secured on the second body member 1007. Furthermore, by mounting the dust cap 1010 at the second connection region 1009, the first connection region 1006 is free to cooperate with the threaded region 242 of the tether MFC 243 (e.g., see FIG. 8) to mount the loop back device 1000 to the tether 240.

After factory termination and assembly, the distribution cable 220 can be installed and tested as described above. When the fibers of the tether 240 have been tested and the tether 240 is ready to be coupled to a subscriber location 115 (FIG. 1) or intermediate location, the loop back device 1000 can be removed (e.g., unscrewed) from the tether 240 to provide access to the tether connector 243. The tether connector 243 is then freely accessible. For example, the tether connector 243 can be plugged into a drop terminal 104 as shown in FIG. 1.

The dust cap 1010 is removed from the second end 1004 of the loop back device 1000 and installed over the first end 1002 to protect the ferrule 1003. For example, the dust cap 1010 can be removed from the connection region 1009 of the second body member 1007 and mounted to the first body member 1005 covering the ferrule 1003 (e.g., see FIG. 13). In an embodiment, the dust cap 1010 mounts to (e.g., screws onto) the first connection section 1006 of the first body member 1005.

The dust cap 1010 may define a hollow interior into which portions of the first end 1002 of the device 1000 and/or the ferrule 1003 may extend. Mounting the dust cap 1010 over the exposed ferrule 1003 protects the ferrule 1003 from damage and environmental contamination. Advantageously, by protecting the ferrule 1003, the dust cap 1010 facilitates reuse of the loop back device 1000.

Systems and methods consistent with the invention make possible the fabrication, installation and testing of distribution cables for passive optical networks. For example, a distribution cable may be spliced using factory integrated termination assemblies to provide compact and environmentally sound breakouts to facilitate easy connection of subscribers to a communications network.

The foregoing description of exemplary embodiments of the invention provides illustration and description, but is not intended to be exhaustive or to limit the invention to the precise form disclosed. Modifications and variations are possible in light of the above teachings or may be acquired from practice of the invention.

For example, implementations consistent with the principles of the invention can be implemented using connectors, receptacles, over-molding techniques, and methods other than those illustrated in the figures and described in the specification without departing from the spirit of the invention. Furthermore, additional features can be added, or removed, depending on specific deployments, applications, and the needs of users and/or service providers.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The above specification, examples and data provide a complete description of the manufacture and use of the composition of the invention. Since many embodiments of the invention can be made without departing from the spirit and scope of the invention, the invention resides in the broad inventive aspects disclosed herein.

The invention claimed is:

1. A loop back device configured to couple to an optical connector, the loop back device comprising:
   (a) a housing extending from a first end to a second end, the housing enclosing a ferrule coupled to a fiber loop, the first end of the housing defining an opening through which the ferrule can be accessed, the first end of the housing also defining a first connection region at which the housing can couple to the optical connector, the second end of the housing defining a second connection region; and
   (b) a dust cap configured to mount selectively to the first connection region and the second connection region of the housing, wherein the dust cap protects the ferrule when mounted to the first connection region.

2. The loop back device of claim 1, wherein the first connection region is a threaded region.

3. The loop back device of claim 1, wherein the ferrule is a multiple fiber connector ferrule.

4. The loop back device of claim 3, wherein the fiber loop defines six optical pathways.

5. The loop back device of claim 1, wherein the dust cap defines an interface region which cooperates with the first and second connection regions of the housing.

6. The loop back device of claim 5, wherein the interface region is defined on an exterior of the dust cap.

7. The loop back device of claim 1, wherein the housing includes a first body member and a second body member.

8. A method of testing optical fibers in a fiber optic network, the method comprising:
   transmitting a signal on a first optical path at a first location;
   looping back the signal at a second location by using a fiber loop of a loop back device to transmit the signal from the first optical path to a second optical path, the fiber loop being accessible at a first end of the loop back device;
   receiving the signal at the first location on the second optical path;
   removing the loop back device from the first and second optical paths;
   removing a dust cap from a second end of the loop back device, the second end being different from the first end; and
   protecting ends of the fiber loop by mounting the dust cap to the loop back device at the first end of the loop back device over the ends of the fiber loop.

9. The method of claim 8, further comprising testing the signal received at the first location for signal degradation.

10. The method of claim 8, wherein the loop back device is connected to the fiber optic network when the first and second optical paths are installed.

11. The method of claim 8, wherein the first location is a central office.

12. The method of claim 8, wherein the second end is a factory-integrated termination location.

* * * * *